United States Patent [19]

Mattson

[11] Patent Number: 4,632,353
[45] Date of Patent: Dec. 30, 1986

[54] SEAT ADJUSTMENT DEVICE IN PARTICULAR FOR VEHICLE SEATS

[75] Inventor: Bertil A. Mattson, Gothenburg, Sweden

[73] Assignee: Broderna Hammarstedt Verkstads AB, Sweden

[21] Appl. No.: 857,526

[22] Filed: Apr. 23, 1986

Related U.S. Application Data

[63] Continuation of Ser. No. 622,167, Jun. 19, 1984, abandoned.

[30] Foreign Application Priority Data

Jun. 20, 1983 [SE] Sweden ................... 8303505

[51] Int. Cl.$^4$ .............................. F16M 11/24
[52] U.S. Cl. .................. 248/396; 248/398; 248/422
[58] Field of Search ............ 248/422, 396, 394, 398

[56] References Cited

U.S. PATENT DOCUMENTS

| | | | |
|---|---|---|---|
| 1,957,785 | 5/1934 | Knapp | 248/422 X |
| 2,132,009 | 10/1938 | Ball | 248/422 X |
| 2,298,351 | 10/1942 | Rose | 248/422 X |
| 2,930,428 | 3/1960 | Rose | 248/422 X |
| 3,552,707 | 1/1971 | Tanaka | 248/394 |
| 4,190,225 | 2/1980 | Bauer et al. | 248/394 |
| 4,285,487 | 8/1981 | Kazaoka et al. | 248/394 X |
| 4,406,497 | 9/1983 | Klüting | 248/396 X |
| 4,448,381 | 5/1984 | Anspaugh et al. | 248/394 |

Primary Examiner—Ramon S. Britts
Assistant Examiner—David M. Purol

[57] ABSTRACT

Elevation adjustment device primarily for vehicle seats. The seat comprises a frame (1) with an upper part (2, 4, 5) with seat surfaces and a lower part (6), which is supported by the vehicle, and a mechanism (9), which connects the upper part and the lower part. The mechanism (9) comprises a number of gear wheels (14, 16), which are lodged in the one of the parts and on the other part corresponding cog tracks (12, 13) with their longitudinal direction extending in the adjustment direction. Through the rotation of the gear wheels is achieved motion along the corresponding cog track and thus changed elevational position among the parts. Adjacent to the respective gear wheel (14, 16) is disposed an additional cog track (23, 25) in an oppositely directed position in relation to the respective first mentioned cog track. The additional cog tracks are moveable into and out of engagement with the respective gear wheel. An operating device (42) is adapted to bring the cog tracks into and out of engagement with the respective gear wheel. Hereby each of the gear wheels can be released for unrolling along its first mentioned cog track, when the additional cog track is located out of engagement, alternatively be locked against rotation, when the additional cog track is located in engagement.

1 Claim, 7 Drawing Figures

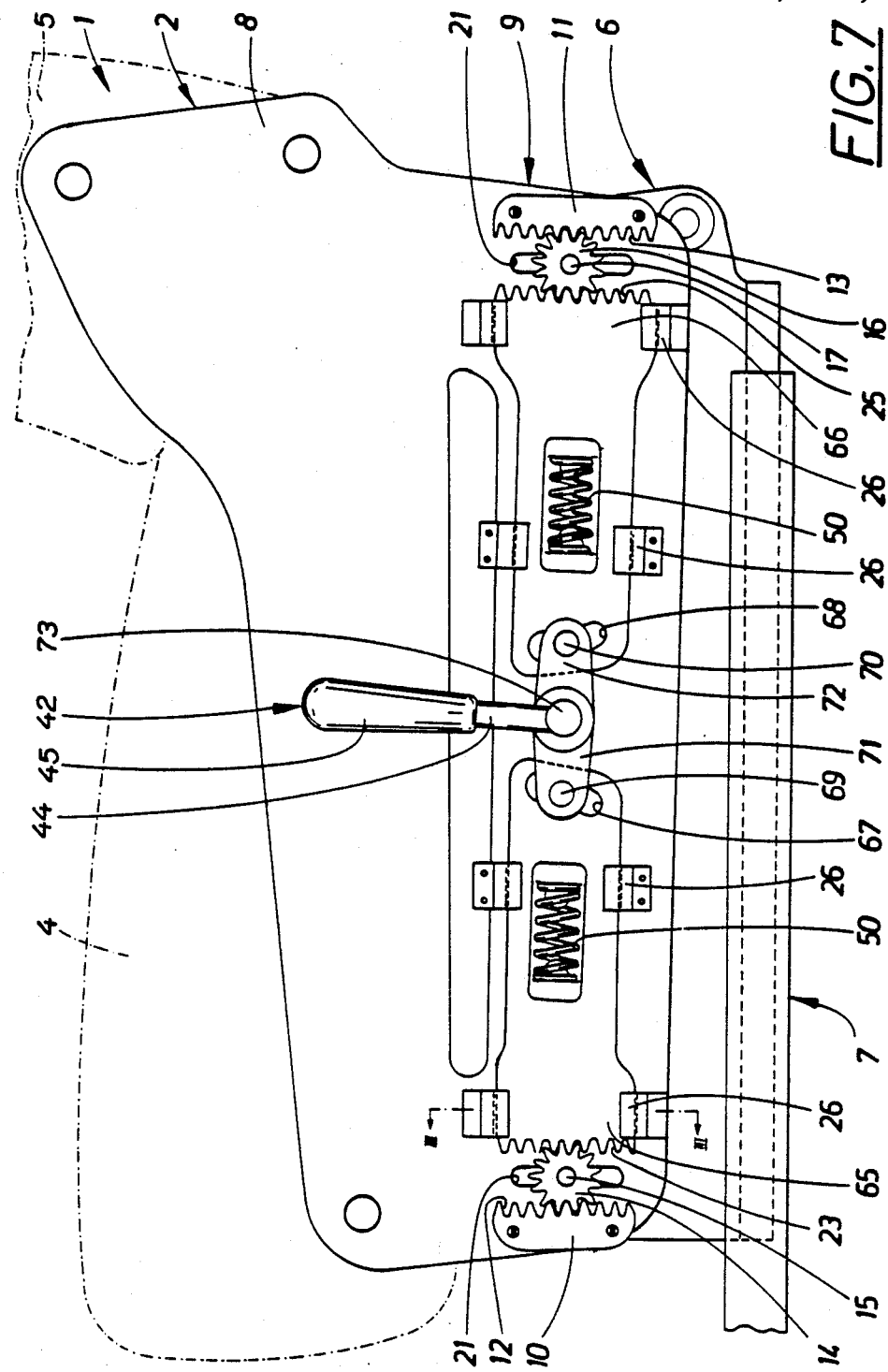

SEAT ADJUSTMENT DEVICE IN PARTICULAR FOR VEHICLE SEATS

This application is a continuation of application Ser. No. 622,167, filed June 19, 1984, now abandoned.

The present invention relates to a device for seats, in particular vehicle seats for adjustment of the elevational position of the seat, which has a frame with an upper part, that supports bodies, which has the seat surfaces of said seat, a lower part, supported by the foundation, and a mechanism, which connects the upper part and the lower part and which is arranged to allow movement of the parts in relation to each other in elevational direction for elevational adjustment of the seat surfaces. The mechanism comprises a number of gear wheels, which are lodged in one of the parts and on the other part corresponding cog tracks with their longitudinal direction extending in the adjustment direction, such that by rotation of the gear wheels motion along the corresponding cog track and thus changed position among the parts is achieved. In in connection with the respective gear wheel there is arranged an additional cog track in an opposedly directed position in relation to the respective first mentioned cog track, where the additional cog tracks are moveable into and out of engagement with the respective gear wheels and immoveable in their longitudinal direction in relation to the respective first mentioned cog tracks such that, owing to that the additional cog tracks are brought into and out of engagement with the respective gear wheel, each of the gear wheels can be released for unrolling along its respective first mentioned cog track, when the additional cog track is out of engagement, and alternatively be locked against rotation, when the additonal cog track is in engagement.

More specifically the present invention relates to the capability of the seat of being raised and lowered, consequently the mechanism for independent elevation and lowering of the front and the rear end of the seat for adjustment of the absolute elevational position as well as the inclination of the seat in the longitudinal direction.

The demand for appropriate adjustability for adaptation to individual desires of primarily vehicle seats is presently very large. Consequently, it is demanded that at least the driver's seat can be displaced to and fro and can be elevated and lowered with independent adjustment of the front and rear end. By the elevation and lowering of the front end and the rear end respectively, there shall take place a parallel displacement in the transverse direction, such that lateral inclinations cannot result from the adjustment operation. In this connection should also be noted the very great demands on a vehicle seat and its mechanism for adjustment with regard to absorption of forces. It must not occur that the seat comes loose or displaces itself during a collision.

The cited demands on the elevational adjustability of the seat have been met with different mechanisms. As an example can be mentioned frames with rows of holes in which the seat can be fastened on an optional level with the aid of bolts. There are also solutions, where the row of holes has been replaced by a kind of cams, where the different adjustment levels are connected by means of a vertical slot. In this way it is not necessary that those bolts are pins, which retain the seat, and be brought out of the holes, but they can be laterally displaced in the slot and be brought up or down. These various types of systems for fastening with screws or anchoring have however the disadvantage, that the adjustment requires a certain amount of work, which in addition is inconvenient since the mechanism is squeezed under the seat. Attempts have therefore been made to simplify the adjustment by arranging levers on which the seat is resting and which can be adjusted in different angles. Also with such mechanisms it has not been possible to obtain the desired simpleness by the adjustment.

In addition there have been produced vehicle seats by which the adjustment is carried out by means of a type of element for force transmission such as a gear wheel of certain kind. In this way there can be obtained a simply operatable device, which however is so easily displaced, that specific locking mechanisms have to be envisaged. It has then turned out to be difficult to obtain a locking which satisfies the cited demands on security without becoming too complicated or so difficult to operate that the benefits of the simple adjustment is lost.

An object of the invention is to provide a mechanism for an adjustable seat such as a vehicle seat, which mechanism allows the cited elevational adjustment and thereby offers a parallel displacement of both sides.

Another object of the invention is to obtain an adjustment mechanism adapted for vehicle seats, capable to withstanding also very large forces, which can result during collisions.

Another object of the invention is to produce an adjustment mechanism, which in locked position displays a clamping of the concerned parts, such that suppression of rattling can be guaranteed, which is of great value in particular for vehicle seats.

An additonal object is to obtain a mechanism, which is adaptable to different operating levels: Adjustment of the seat by manual displacement of the same, spring action displacement, such that the seat is adjusted by the action of a spring dependent on compressive load application when the mechanism is released, and motor adjustment.

The object of the invention is achieved by effecting the device characterized in that the additional cog tracks are arranged on plates, which are displaceable in a direction generally perpendicular to the axis of the respective geat wheel to and from an engagement position on the gear wheels, which is generally diametrically opposed to the engagement position of the respective gear wheel in regard to first mentioned cog tracks.

Two embodiments of the invention, related to a vehicle seat, are represented in the attached drawings.

FIG. 7 represents in an elevational view corresponding to the view in FIG. 1, the second embodiment.

Figure 1:
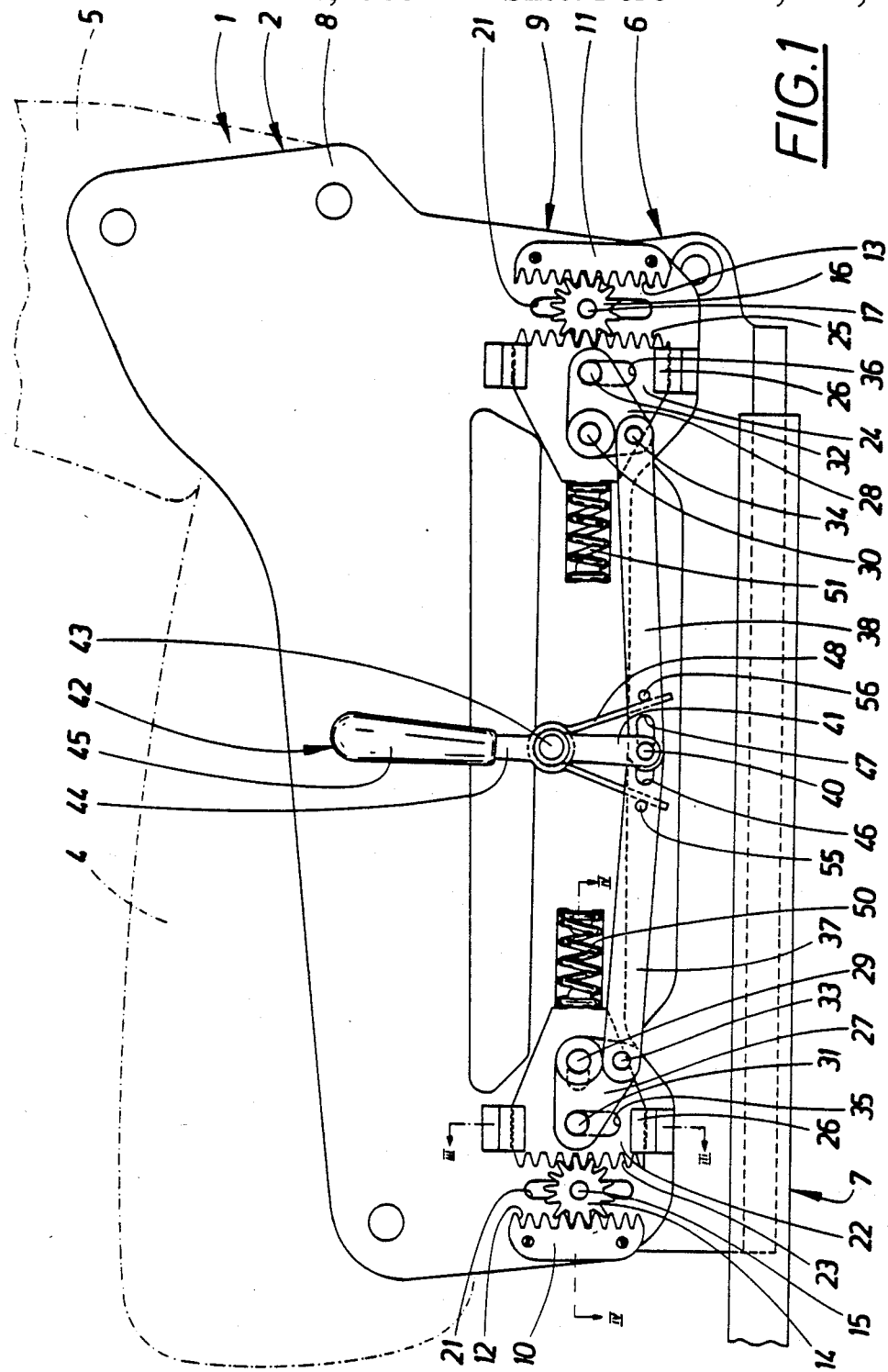
FIG. 1 represents a side elevational view of a frame to a vehicle seat.

According to FIG. 1 a frame 1 to a vehicle seat has an upper part 2, which is arranged to support the seat cushion 4 of the seat and its back rest 5, which are indicated in FIG. 1 with dash dotted lines.

The upper part 2 is supported in a way, that is described in detail below, by a lower part 6, which in turn is supported by guides 7, which are fastened to the floor of the vehicle. The mentioned parts are represented in side elevational view and in this appears only the one gable of the seat and the frame, where shall be understood that the seat has two generally similar but in relation to each other mirror-inverted gables. These are connected as a unit, which consequently forms the frame of the seat with a width, which corresponds to the seat cushion and the back rest. The transverse parts which are necessary for the formation of this unit are not represented but may consist of for example bars, which connect the mentioned gables.

Figure 2:
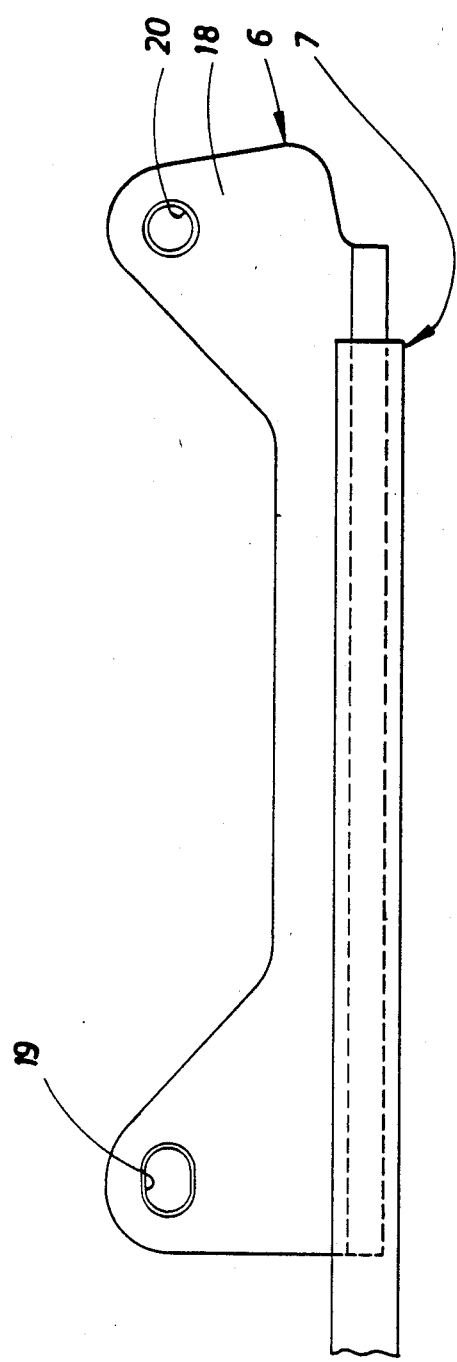
FIG. 2 represents separately a lower part of the frame shown in FIG. 1.

The lower part 6 is consequently formed by two gables and both of these are lodged in a guide 7. In this way the frame unit may be displaced to and fro and may be locked in the desired position. The displacement mechanism is however not an object of the invention and is therefore not represented in its details and its locking mechanism has been suppressed. A side elevational view of the lower part 6 and the guide 7 is also represented in FIG. 2.

The upper part 2 of the frame has on each side, of which one side is represented in FIG. 1, as main part a gable plate 8, which at its lower edge supports a mechanism for elevational adjustment 9. This comprises a plate 10, which is fastened at the front edge of the lower part, and a plate 11, placed at its rear edge, each of which are provided with cog tracks 12 and 13, which are directed towards the center of the lower part. Gear wheel 14, which is provided with a shaft 15, engages the front cog track 12. In the same way a gear wheel 16, provided with a shaft 17, engages the rear cog track 13. Both the shafts 15, 17 run through oblong holes in the gable plate 8. As appears above there are corresponding gear wheels at the other gable of the seat and within each pair of gear wheels the shaft is common and extends consequently across the whole width of the frame. The gear wheels are rotationally fixed to the respective shaft and a rotation of the shaft thus means that both the gear wheels on the shaft roll on its respective cog track. The gear wheels present only a slight play against the gable plates 8 and become in this way axially guided.

Both the shafts 15 and 17 run through the lower part 6, which also presents two gable plates 18. For this purpose there are provided in the front edge of these plates holes 19 for the shaft 15 and holes 20 for the shaft 17. One of the holes, which has been illustrated as hole 19, is prolonged beyond cylindrical shape in horizontal direction. This is to allow inclination of the upper part 2 in relation to the lower part 6, which for different angles of inclination means that the shaft 15 moves back and forth in the hole 19.

The mechanism 9 comprises in addition on each of the gable plates 8 a front locking plate 22 provided with a cog track 23, which is opposed to the cog track 12, and a rear locking plate 24, which is provided with a cog track 25, which is opposed to the cog track 13. The locking plates 22 and 24 are movable towards and away from the gear wheel 14, respectively 16, by being displaceably lodged within clamps 26, of which in total a number of four are arranged on each gable plate 8. The displaceability is then so adapted, that the cog tracks 23 and 25 can be brought to the position shown in FIG. 1 in engagement with the respective gear wheels 14 and 16 or alternatively to a farther position completely out of engagement with the gear wheels.

For the mentioned displacement of the plates 22 and 24 are arranged two levers in the form of triangular shaped plates, one plate 27 and the other 28, which are lodged on shafts 29 and 30. The levers 27, 28 each form two lever arms, on the one hand a lever arm between the shaft 29 and a pin 31, respectively between the shaft 30 and a pin 32, and on the other hand between the shaft 29 and apin 33, respectively between the shaft 30 and a pin 34. The pins 31 and 32 respectively engage in oblong holes 35 and 36 in the locking plates 22 and 24 respectively. The pins 33 and 34 are each connected with a link 37 and 38, respectively.

The links 37 and 38 meet approximately at the center of the lower part where they are connected by means of a pin 40 with an arm 41 of a operating handle 42 of which a second arm 44 is situated on the top side of a shaft 43, which is fastened to the gable plate 8, which arm 44 is provided with a handle 45. The pin 40 engages in oblong holes, denoted 46 for the forwardly directed link 37 and 47 for the rearwardly directed link 38. Thereby the holes are so situated in relation to the pin 40 that if the handle 45 is brought forwardly (in direction away from the back rest 5), then the pin 40 contacts, already in the central position illustrated in FIG. 1, the outer end of the groove 46, so that the ink 37 is brought backwards. The pin 40 however, has such space in the groove 47 that the link 38 is not affected. By movement of the handle 45 rearwards the arm 41 is brought forwards and the pin 40 then pulls the link 38 forwards while the link 37 is not affected. A spring 48 strives to keep the links in their outer positions and thus also the operating handle 42 in the illustrated central position. The spring rests against pins 55 and 56 on the links.

The mechanism 9 appears as mentioned on both sides of the seat and includes then preferably also the now described locking mechanism. Thereby the locking plates 22, 24 of both sides must be operable. To this end the shaft 43 is continous and thus controls via the described links the locking plates of both sides. However it is only necessary that the shaft is provided with the handle 42 on the one side.

Figure 3:
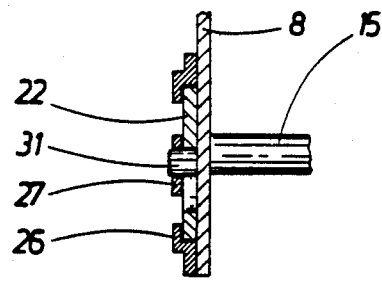
FIG. 3 represents a sectional view along the line III—III in FIG. 1.
Figure 4:
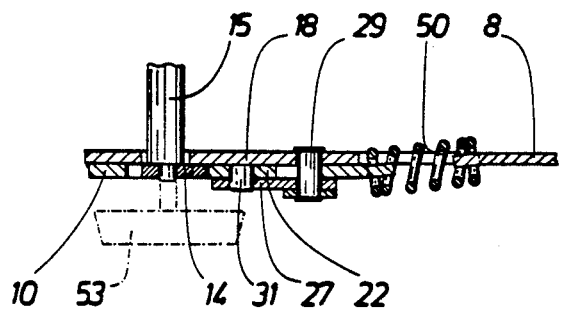
FIG. 4 represents a sectional view along the line IV—IV in FIG. 1.

In addition shall be mentioned that the front locking plate 22 is biassed in direction towards the gear wheel 14 by a compression spring 50, which is lodged on pins on the one hand in the plate 22 and on the other hand in the gable plate 8. In the same way the locking plate 24 is biassed in direction towards the gear wheel 16 by a compression spring 51. Certain of the described details which make part of the mechanism 9 are also shown in the sections of FIGS. 3 and 4. In these sections is indicated how the shaft 15 (and 17) extend inside beneath the seat and as mentioned to its other side where another gear wheel which corresponds to the gear wheel 14 (respectively 16) is fastened.

The mechanism illustrated in FIG. 7 is in its main parts similar to the previously described first embodiment. Therefore similar parts have received similar references. This applies also to the cog tracks 23 and 25 of the locking plates. On the other hand the very locking plates have differing structure and have received references 65 and 66 for the front and the rear plate, respectively. The plates are prolonged in relation to the previous embodiment and extend so far towards the center of the seat gable that merely a minor space remains between them. To this end the locking plates are provided with recesses 67 and 68 respectively with guiding cam surfaces. In these recesses engage pins 69 and 70 on a lever with two arms 71 and 72 which act as links. The lever is lodged on a shaft 73 and here too applies what has been mentioned previously about the doubling of the mechanism for placement on both sides of the seat. The shaft 73 is provided with a bar system, which as previously is denoted by 42, 44, 45. By means of the bar 45 the shaft 73 may thus be rotated together with the levers 71 and 72, whereby a corresponding lever on the other side of the seat is simultaneously rotated.

The recesses 67 and 68 present above the center of the shaft 73 arch-shaped surfaces, of which the center coincides with the center of the shaft 73. Below the center of the shaft however, the edge surfaces extend outwardly, downwardly in relation to the corresponding arches. The width of the recesses is adapted to the pins 69, 70.

Figure 5:
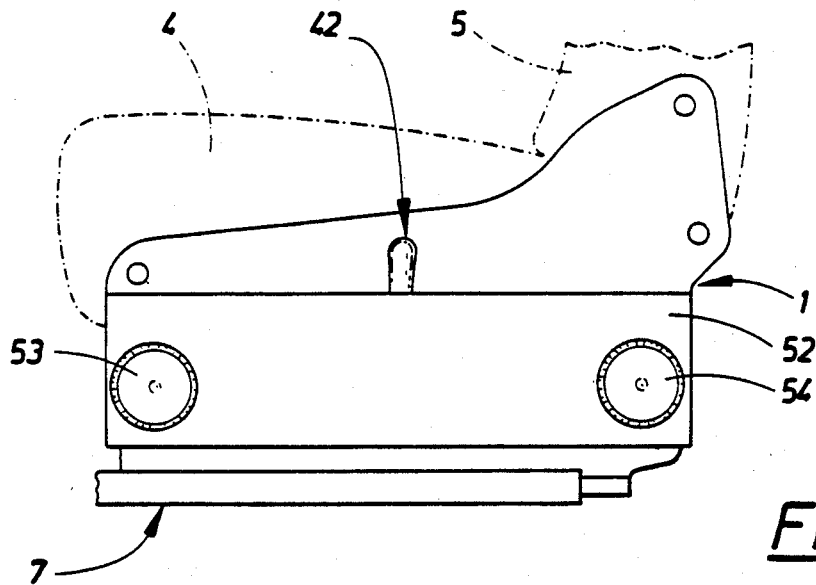
FIG. 5 represents the whole seat in side elevational view in smaller scale as compared to the other drawings.

In FIG. 5 is illustrated in more schematical form the exterior of the car seat from the side. Here appears the frame 1, the seat cushion 4 and the back rest 5 as well as the supporing guide 7. The mechanism 9 is not shown while it is supposed to be hidden by a cover 52. However, the handle 45 of the operating handle 42 protrudes from the cover as well as a front wheel 53 and a rear wheel 54. The wheels 53, 54 are fixed at the shafts 15 and 17 respectively, and are adapted for rotation of the shafts, in which rotation thus the gear wheels 14 and 16 participate.

Alternatively, the shafts 15 and 17 may be provided with springs, which tend to rotate the shafts and hence the gear wheels in that direction which provokes an elevation of the seat. The springs can thereby be for example helical springs or torsions springs. The spring force shall be so adapted that it is capable of lifting the seat when it is not loaded, however not with larger force than that with which the seat may be displaced downwardly if one's body weight is applied against the same or if it is forcibly pressed downwardly with the hand.

Figure 6:
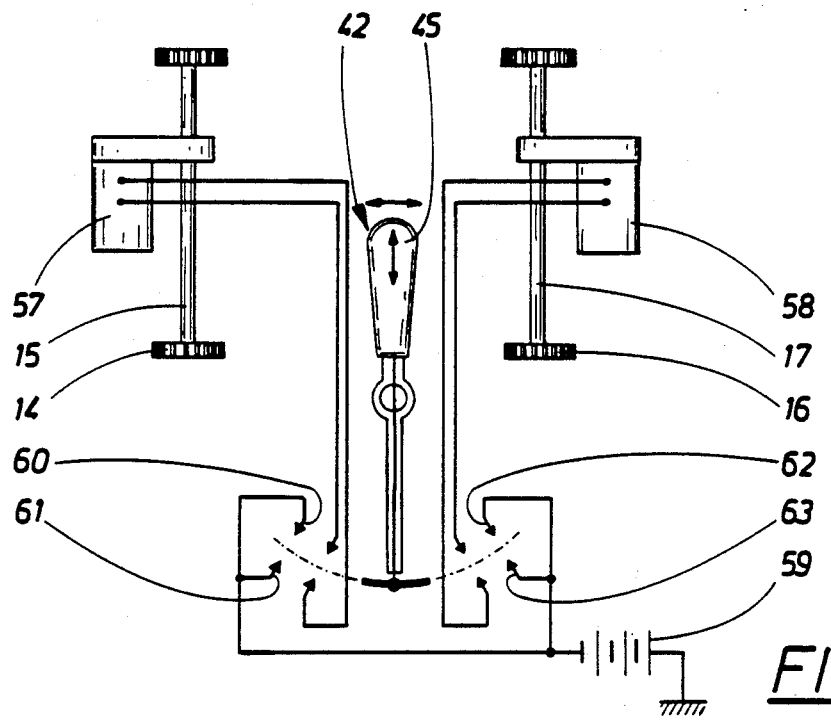
FIG. 6 represents schematically a functional diagram.

As mentioned the device may alternatively be adapted for adjustment by means of an electrical motor for each of the shafts 15, 17, being connected to the corresponding shaft by means of a suitable gear change. The motors are reversible and may be started in any direction and stopped by means of actuating devices. In FIG. 6 is illustrated schematically a possible actuating system for electrical drive. In the figure appear the shafts 15 and 17 with their gear wheels 14 and 16 together with the operating handle 42 with the handle 45. The shafts 15 and 17 are arranged to be driven by reversible motors 57 and 58. These are connected to a battery 59 via switch mechanisms 60-63. The switch mechanisms are arranged to switch the power supply to the one or to the other motor in such a way that the connected motor is moving in that direction, in which the front edge, respectively the rear edge, is rising, alternatively in that direction, in which the corresponding edge of the seat is sinking. The switch mechanisms are connected to the handle 45 of the operating handle, which under spring load strives to assume a neutral position, but which from this may be forced upwardly or downwardly. The switch device is thereby so connected to the handle that by pulling upwardly of the same the direction of movement for the connected motor will lead to the rise of the seat while pressing downwardly will lead to a lowering of the seat. The switch mechanisms are affected also by the operating handle 42 depending on if it is moved forwardly or backwardly in that way which has been described previously. Thereby the front motor 57 is to be connected when the bar is moved forwardly and the rear motor 58 when the bar is moved backwardly.

In the position shown in FIG. 1 the gear wheels 14 and 16 hold the front, respectively the rear edge, of the seat in an elevational position, which is dependent on the positioning of the gear wheel in the cog track 12, respectively 13. The gear wheel is supported by its respective shaft by the lower part 6 through contact in the holes 19 and 20 respectively. Upon change of the seat the flow of forces thus runs from the seat cushion 4 to the upper part 2 with its fastened plates 10 and 11 and from the cog tracks 12 and 13 to the gear wheels 14 and 16 and from these the forces pass to the shafts and over the edges of the holes 19 and 20 to the lower part 6 and from this to the guides 7 and to the floor of the vehicle. If the gear wheels were not locked this force would strive to rotate them, such that the seat were lowered while the gear wheel simultaneously were rolling along the cog track to the upper end of the same. The gear wheels are however locked between their respective cog tracks 12 and 23 and 13 and 25. Since both these cog tracks cannot be displaced in their longitudinal direction with respect to each other, rotation of the gear wheel is made impossible and an immovable joint is obtained, which is capable of absorbing the load which is exerted on the seat.

If it is desired to adjust the front edge of the seat the operating handle 42 is moved forwardly. Thereby the link 37 is pulled backwardly by means of the pin 40 and the lever 27 turns downwardly with its pin 31. This is thereby moved in its circular orbit simultanously backwardly while it is displaced in the oblong hole 35. This leads to also the locking plate 22 being pulled backwardly and is removed from the gear wheel with its cog track 23. Now the gear wheel 14 may be rotated and will then roll along the cog track 12. Since the shaft of the gear wheel can not be displaced in elevational direction the plate 10 and thereby the front edge of the upper part 2 will instead be displaced in elevational direction upwardly or downwardly dependent on how the gear wheel is rotated. If the operating bar is released the front part of the spring 48 will push back the link 37 at the same time as the spring 50 helps to bring the locking plate 22 in direction towards the gear wheel. Thereby the cog track 23 resumes engagement with the gear wheel and this becomes locked again.

If it is desired to adjust the rear edge of the seat the handle 45 is pulled backwardly, whereby the link 38 is pulled backwardly by the pin, such that the locking of the gear wheel is released in that way which has been described.

The very locking function is the same in the second embodiment according to FIG. 7. However the locking plates 65, 66 are actuated directly by the levers 71, 72 of the bar system which acts as links. If the handle 45 is brought forwardly the pin 69 will be brought downwardly in the recess 67 and will thereby press against its outwardly turning edge, which leads to the locking plate 65 being brought towards the middle and away from the gear wheel 14. Simultanously the pin 70 is moved upwardly in the recess 68, whereby it however follows the same circular orbit, as the recess 68 is provided with above the center of the shaft 73. The locking plate 66 thus maintains its locking position. By movement of the handle 45 rearwardly inverted function is obtained. In the second embodiment the described parts thus form a link device of different structure than the first embodiment. The resulting movement of the locking plate however remains the same.

The adjustment can be carried out through rotation of the wheels 53 and 54 in manual operation. If the seat is provided with springs a rise of the front respective rear edge of the seat results if the bar 42 is moved in the corresponding direction and if the seat is not loaded. The front respective rear edge may then be pushed down to the desired position if the bar still is held in neutral position, whereby the corresponding spring simultanously is strained. The depression may for example be carried out through sitting on the seat, whereby it rises if the body weight is released and sinks if it is loaded, an adjustment which can be carried out alternatively for the front and the rear edge by operating the bar. In electrical operation at desired elevation of the front edge of the seat the handle 45 is pulled upwardly and is brought forwardly, whereby the motor 57 is driven in that direction which rotates the gear wheel 14 clockwise (as seen in FIG. 1). If instead the handle is pushed downwardly the motor is connected for drive in the opposite direction. In the same way the motor 58 can be driven in either direction by displacement of the handle 45 when this has been brought backwards.

Through the invention results a very safe but at the same time easily releasable locking of the seat in the adjusted position. For this locking is used the gear wheels which are utilized for the elevational displacement of the seat. Through the gear wheels is obtained a very simple and appropriate means to adjust the seat in elevational direction either by rotation of a wheel, which is directly connected to the gear wheel, by means of a spring or by rotation of the gear wheels by means of a motor. The use of gear wheels for the elevational adjustment is thus in itself advantageous. Still bigger advantages are obtained through simultaneous use of these gear wheels and their cogs for the necessary locking. Hereby is avoided specific structural members such as friction or tooth breaks. Squeezing of the gear wheel between two cog tracks in the locked position also allows the possibility to achieve a device free from play.

The invention may be varied within the frame of the subsequent claims. Thus the function of the upper part and the lower part may change place, such that the mechanism 9 is disposed on the lower part and the gear wheels are lodged in the upper part. The execution of connecting parts for the fastening of the seats to the foundation as well as the part for formation of the seat surfaces are irrelevant for the invention. Even if the device primarily is intended for vehicle seats where requirements, which are satisfied by the device, are set up the use of the device also for other seats, such as working chairs, lies within the frame of the invention.

I claim:

1. Seat adjustment device for adjusting the elevational position of the seat, said seat having a frame with an upper part to support bodies, resting surfaces carried by said upper part, a lower part, and a foundation supporting said lower part, said device comprising a mechanism connecting the upper part and the lower part including four gear wheels carried on a first of said upper and lower parts by means of two shafts extending between two opposite sides of said part, said gear wheels being carried at the outer ends of the shafts with each side of said first part being provided with two gear wheels each connected to one of said shafts and with an intermediate space between them, members operably connected with each of said shafts for rotating them, cog tracks carried by the other of said upper and lower parts, each cog track being in permanent engagement with a corresponding gear wheel outside of the intermediate space at said opposite sides of the first part and having its longitudinal direction extending in a substantially vertical direction, such that by rotating said gear wheels they are moved along their corresponding cog tracks and cause movement of the upper part in relation to the lower part in elevational direction for elevational adjustment of the resting surfaces, locking means for each gear wheel in the form of an additional cog track, the additional cog tracks being disposed in said intermediate space and each additional cog track being disposed in an opposedly directed position in relation to the respective first mentioned cog track for the gear wheel, the additional cog track being movable into and out of engagement with its respective gear wheel and immovable in its longitudinal direction in relation to its respective first mentioned cog track by also being attached to the other of said parts, means for moving each additional cog track into and out of engagement with its respective gear wheel so that the respective gear wheel can be released for moving along its respective first mentioned cog track when its additional cog track is out of engagement therewith and locked against rotation when its additional cog track is in engagement therewith, each additional cog track being arranged on a plate which is slidably carried on a side of the other of said parts, said plate being slidable in said intermediate space in a direction generally perpendicular to the longitudinal direction of its respective first mentioned cog track to and from an engagement position with its respective gear wheel which is generally diametrically opposed to the engagement position of the gear wheel in regard to its respective first mentioned cog track, in each intermediate space there being provided a pivotable maneuverable operating member with the member of each side being connected by means of a pivoting shaft to the member of the other side to be pivoted simultaneous therewith, each of said plates being connected to the operating member of its respective side by means of a cam-like surface cooperating with a follower pin, the cam-like surfaces of each plate having a first portion forming a circular path for the pin, the center of said path being co-axial with the center of the pivoting shaft, and a second portion forming a curve extending towards said center of the shaft from one end of the first portion, the first portions extending in the same direction from a line crossing said center of the shaft and the second portions extending from said line in the opposite direction, so that, when the operating member is pivoted in one direction, one follower pin for one plate of each of the respective sides will follow the circular path without moving the respective plate while the other pin will follow the curve thus actuating its respective plate which moves to unlock the respective gear wheels connected to the same shaft at one end of the seat and reverse when the operating member is pivoted in the other direction.

* * * * *